United States Patent [19]

Scheithauer

[11] 4,051,546

[45] Sept. 27, 1977

[54] GAS TUBE ARRESTER PROTECTOR

[75] Inventor: Eric A. Scheithauer, Chicago, Ill.

[73] Assignee: Cook Electric Company, Morton Grove, Ill.

[21] Appl. No.: 637,713

[22] Filed: Dec. 4, 1975

[51] Int. Cl.$^{2}$ .......... H02H 3/22

[52] U.S. Cl. .......... 361/124; 361/120; 337/31

[58] Field of Search .......... 317/66, 62, 61, 61.5, 317/16, 116, 120; 337/31, 28, 29, 33, 34

[56] References Cited

U.S. PATENT DOCUMENTS

| | | | |
|---|---|---|---|
| 842,628 | 1/1907 | Cook | 317/66 X |
| 944,258 | 12/1909 | Cook | 317/66 X |
| 1,092,510 | 4/1914 | Allendorf | 337/31 |
| 1,144,028 | 6/1915 | Creighton | 337/31 X |
| 3,310,712 | 3/1967 | Paddock | 317/120 |
| 3,340,431 | 9/1967 | Wanaselja | 317/61 X |
| 3,710,191 | 1/1973 | Peche | 317/62 |
| 3,778,679 | 12/1973 | Jonassen | 317/40 A |

*Primary Examiner*—J D Miller
*Assistant Examiner*—Patrick R. Salce
*Attorney, Agent, or Firm*—Mason, Kolehmainen, Rathburn & Wyss

[57] ABSTRACT

A gas tube arrester protector for protecting a pair of telephone lines from high voltage or surge current includes an insulating housing in which is disposed a three electrode gas tube overvoltage arrester having a pair of line electrodes and a ground electrode. The ground electrode is coupled to ground potential and each of the line electrodes is coupled to one of the telephone lines through a terminal line, a supporting terminal and a fusible link. The fusible links are in thermal relationship with the line electrodes and extend through cavities formed by spacers disposed adjacent each of the line electrodes. Whenever the line electrodes are heated sufficiently during an extended fault condition, the fusible links melt within the spacer cavities such that the line electrodes are disconnected from the terminal lines and thereby from the fault occurring on the telephone lines. The gas tube arrester, the spacer, the supporting terminal and a portion of the terminal lines are fixedly mounted in the housing by an insulating potting compound which fills a portion of the inside of the housing. The remaining portion of the housing can be filled with an inert insulating fill or powder.

5 Claims, 7 Drawing Figures

GAS TUBE ARRESTER PROTECTOR

The present invention relates to a protector for protecting telephone lines from high voltages or surge currents, and more particularly, to a new and improved leaded protector having a gas tube arrester fusibly linked to the telephone lines.

Normally a pair of telephone lines are extended between a telephone central office and a remote location such as a house or the like, to connect each telephone set, including all of the extensions for the same number at a remote location to the telephone central office. For at least the purposes of the present application, the term "station" will be used to refer to not only the telephone equipment including the telephone set and the lines at a remote location, but also the environment such as the house or the like at which the equipment is located. Each such telephone line must be coupled to an overvoltage arrester so that the station including the telephone equipment on the property and/or the people using the equipment are protected from high voltages or surge currents occurring on the telephone lines due to lightning or the like.

There are various types of overvoltage arresters which can be coupled to the telephones lines to protect the telephone lines from such overvoltages or surge currents. Normally, the overvoltage arrester is either of the carbon type or the gas tube type. One such type of carbon overvoltage arrester which can be coupled to each telephone line is disclosed in U.S. Pat. No. 3,703,665, which patent is assigned to the assignee of record of the present application. As disclosed in U.S. Pat. No. 3,703,665, the overvoltage arrester has a spark gap which is sparked over due to a high voltage surge, thus permitting the surge current to flow from the protected line to ground potential instead of the telephone equipment at an individual station.

Many times, this type of carbon overvoltage arrester is mounted in a station protector, such as the ones disclosed in U.S. Pat. Nos. 3,310,712, and 3,345,542, or in U.S. Pat. Application Ser. No. 513,400, filed on Oct. 9, 1974, which patents and patent application also are assigned to the assignee of record of the present application. Such circuit protectors are capable of mounting the overvoltage carbon arresters so that the carbon arresters are coupled between the telephone line to be protected and ground potential. As a result, whenever a high voltage surge occurs on the protected line, the spark gap in the overvoltage arrester is sparked over and the telephone line is coupled to ground potential through the shorted spark gap.

In addition to the carbon type overvoltage arresters, gas tube type arresters can be used in protecting the telephone lines extending to a given station. The gas tube arresters are usually of the two or three electrode type. Certain of the two electrode gas tube arresters have a pair of opposed electrodes hermetically sealed in opposite ends of an insulating spacer tube. Each of the two electrodes has a portion extending into the spacer tube so that a spark gap is formed in the gas chamber formed within the spacer tube. In order to protect a telephone line, one of the electrodes is connected to the telephone line and the other electrode is connected to ground potential in much the same manner as the individual electrodes of the carbon type overvoltage arresters are connected to a telephone line and ground potential. As in the carbon type overvoltage arrester, whenever a high voltage of sufficient magnitude appears on the line connected to the one electrode, the spark gap within the insulating spacer tube breaks down such that the electrodes are electrically coupled together and the high voltage is diverted to ground potential.

In order to protect a pair of telephone lines at a given station, two separate two electrode gas tube arresters are required. In some instances, each of the two electrode gas tube arresters can be inserted in the same cavities of the station protectors disclosed in the aforementioned United States patents and patent application as the carbon type of arresters. On the other hand, a single three-electrode gas tube arrester can be used to protect a given pair of telephone lines extended to the station. Such a three-electrode gas tube arrester will normally have a pair of line electrodes that are connected by insulating spacer members at opposite ends of a central tubular ground electrode so that a spark gap is formed between each of the line electrodes and the central ground electrode. To protect a pair of telephone lines extended to the station, one of the lines is connected to one of the line electrodes; the other line is connected to the other line electrode; and a ground terminal is connected to the central ground electrode. When a high voltage occurs on either or both of the pair of telephone lines, the spark gap between the line electrode coupled to that line and the ground electrode sparks over such that the line is coupled to ground potential and is thereby protected. An example of a means by which the three-electrode gas tube arrester can be mounted in a station protector is disclosed in U.S. Pat. Application Ser. No. 516,286 filed on Oct. 21, 1974, which application is assigned to the assignee of record of the present application.

In many instances, it is desirable to protect the lines not only by the carbon type of overvoltage arresters, but also by the gas tube type arresters operating in a parallel electrical configuration with a carbon arrester between each telephone line and ground. Station protectors equipped only with carbon arresters conventionally provide reliable protection to the telephone lines and station equipment by grounding the lines when exposed to sustained overvoltages caused by voltages being induced from or resulting from direct shorting with electric power lines. However, the carbon arresters are limited in the number of transient overvoltage surges caused by lightning or the like which can be momentarily grounded before the arrester permanently grounds the lines. On the other hand, gas tube arresters conventionally will withstand many more such overvoltage surges than carbon arresters but are less preferred for grounding the line and equipment under sustained overvoltage conditions.

An advantage is gained by paralleling gas tube and carbon arresters if the gas tube activates first under transient surges (rather than the carbon arrester) thus exploiting its longer life under such overvoltage transients until it fails either by grounding the telephone line and equipment, or by being permanently open circuit. In the latter case, the carbon arrester then will respond to subsequent overvoltage transients until it fails by permanently grounding the line and equipment.

If a fusible element is included only in the current path connecting the gas tube arrester to the lines so as to open-circuit such current path under sustained overvoltage conditions, the preferred performance of the carbon arrester under such sustained overvoltages will then take over to protect the lines and equipment.

In order to connect both the gas tube and carbon types of arresters to a given line to be protected, the gas tube arrester sometimes is mounted in the same station protector, such as one of the ones heretofore discussed, as the carbon type of overvoltage arrester.

However, at times when there is a sustained overvoltage condition with relatively low levels of available current, such as when there is one ampere due to a power line cross or induced voltage, the spark gap between the line electrode and the common or ground electrode in the gas tube type of arrester will breakdown but in a high impedance state. As a result, the gas tube arrester is maintained in a glow discharge region of operation or in a glow mode condition. In the glow mode condition, the gas tube arrester is heated due to the passage of current through the relatively high impedance of the spark gap. If the gas tube arrester remains in this glow mode condition for a sufficient amount of time, the arrester would continue to heat until serious physical degradation of the gas tube arrester, and possibly the station protector in which it is located, would occur. The resulting damage to the station protector would leave the lines at the given station unprotected.

Accordingly, objects of the present invention are to provide a new and improved gas tube overvoltage arrester protector utilized to protect telephone lines from high voltages or surge currents; to provide a new and improved overvoltage arrester protector that can be readily coupled in parallel with carbon type arresters to telephone lines; to provide a new and improved overvoltage arrester protector that is readily mounted in available station protectors containing carbon type arresters; to provide a new and improved overvoltage arrester protector that contains a fail open mechanism such that the arrester is disconnected from the telephone lines before the protector is damaged due to heating or the like; to provide a new and improved overvoltage arrester protector that has a fusible lead connecting the line electrodes of the arrester to the lines to be protected; to provide a new and improved overvoltage arrester protector that minimizes the thermal heat transfer from the gas tube arrester during extended conduction of the gas tube arrester; and to provide a new and improved overvoltage arrester protector that is designed to protect the station protector from damage when a coordinating or bridle wire connecting the telephone lines to a station protector will not fuse open.

In accordance with these and many other objects of the present invention, an embodiment of the present invention comprises an overvoltage arrester protector used in protecting pairs of telephone lines at a given station or the like from high voltages occurring on the telephone lines. The overvoltage arrester protector includes a three-electrode gas tube arrester having a pair of opposed line electrodes and a central ground electrode housed in an elongated, insulated shell having one elongated side substantially open. Each of the line electrodes is coupled to one of the pair of telephone lines by means of a terminal line, a supporting terminal or eyelet, and a fusible link, which link extends between the supporting terminal and line electrode and through a spacer cavity formed by an insulating spacer. The ground electrode is coupled to ground potential by means of a ground line attached to the central ground electrode. The gas tube arrester, the terminal lines, the ground line, the supporting terminals and the spacers are maintained in the shell by an epoxy resin which also closes the open side of the shell. The remaining portion of the inside of the shell may be filled with an insulating powder, mineral fill or the like.

Many other objects and advantages of the present invention will become apparent from considering the following detailed description in conjunction with the drawings in which.

Figures 1, 2, 3, 4, 5, 6, 7:
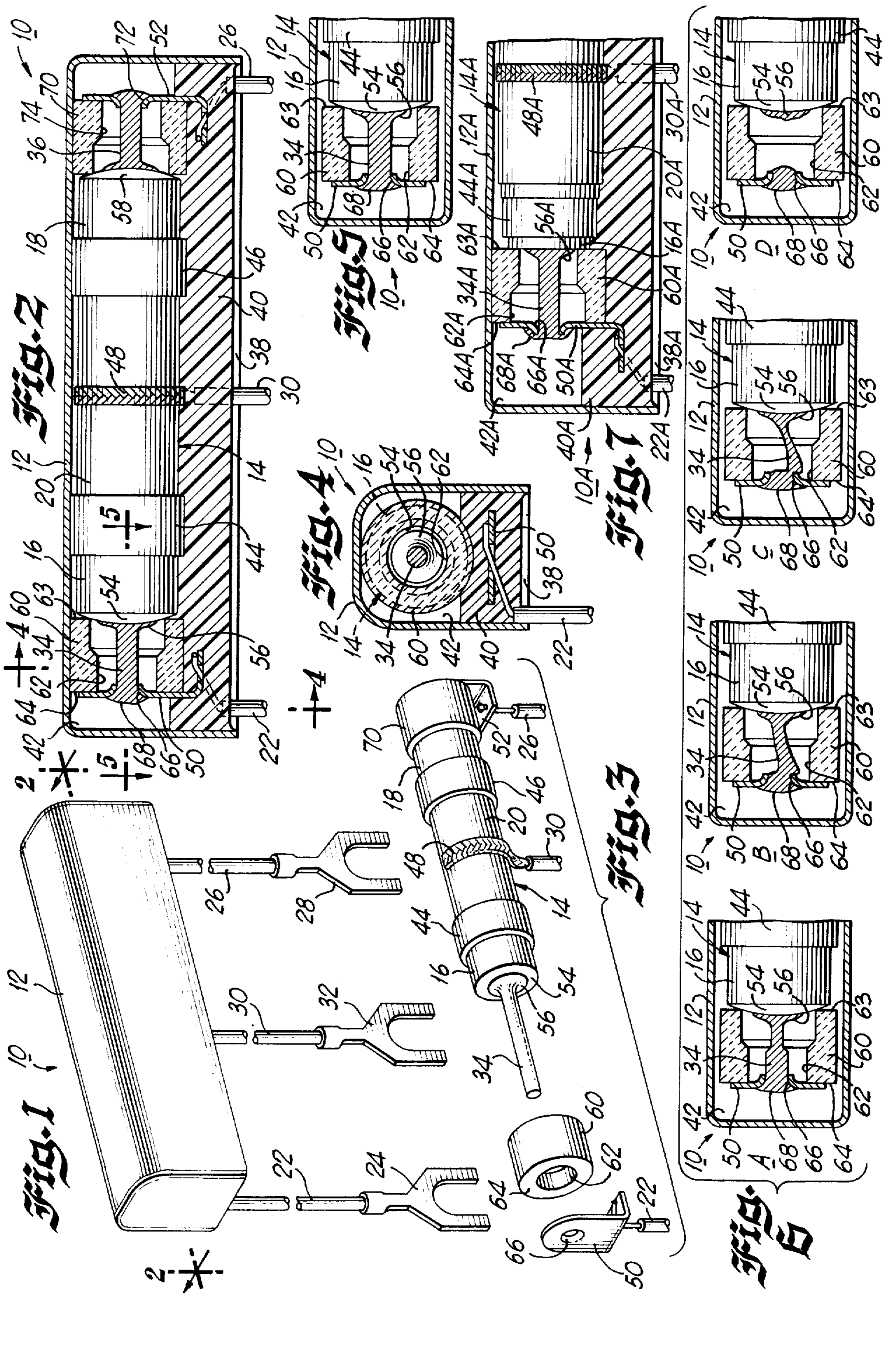
FIG. 1 is a perspective view of the gas tube protector embodying the present invention.
FIG. 2 is a partial cross-sectional view of the gas tube protector of FIG. 1 taken along line 2—2 of FIG. 1.
FIG. 3 is a partially exploded view of portions of the gas tube protector of FIG. 1, portions of which protector are shown prior to assembly.
FIG. 4 is a cross-sectional view of the gas tube protector of FIG. 2 taken along line 4—4 of FIG. 2.
FIG. 5 is a partially cut away, partially cross-sectional view of the gas tube protector of FIG. 2 taken along line 5—5 of FIG. 2.
FIG. 6 is the portion of the gas tube protector shown in FIG. 5 showing the progressive fusing action of the fusible link portion of the gas tube protector.
FIG. 7 is a partially cut away, partial cross-sectional view of an alternate embodiment of the gas tube protector embodying the present invention.

Referring now more specifically to FIGS. 1 and 2 therein is disclosed a gas tube protector which is generally designated by the number 10 and which embodies the present invention. The gas tube protector 10 includes an outer insulating shell or cover 12 in which is housed a gas tube arrester 14. The gas tube arrester 14 is a three-electrode type of gas tube arrester having a pair of line electrodes 16 and 18 at opposite ends of a common or ground electrode 20. The line electrode 16 is coupled to a telephone line to be protected through a terminal line 22 and a terminal 24; the line electrode 18 is coupled to another telephone line to be protected through a terminal line 26 and a terminal 28; and the common or ground electrode 20 is coupled to ground potential through a ground strap 30 and a terminal 32.

Whenever an overvoltage surge condition occurs on either of the telephone lines connected to the terminals 24 and 28, a spark gap formed between the line electrode 16 and the common electrode 20 and/or a spark gap formed between the line electrode 18 and the common electrode 20 is sparked over or is shorted, such that the line coupled to the terminal 24 and/or the terminal 28 are coupled to ground potential through the gas tube arrester and the terminal 32. In such a condition, the spark gap arcs over so that there is a relatively small impedance between the line electrodes 16 and 18 and the ground electrode 20.

However, in certain instances when the available currents are relatively low (such as below one ampere) due to a power line cross or the like, the spark gaps in the gas tube arrester 14 breakdown but remain in a high impedance state such that the gas tube arrester 14 is placed in a glow mode of operation. If the overvoltage condition remains for an extended period of time, the heat generated by the flow of current through the gas tube arrester 14 can cause damage to occur to the protector 10. Consequently, a fusible link 34 is coupled between the line electrode 16 and the terminal line 22, and a fusible link 36 is coupled between the line electrode 18 and the terminal line 26. These fusible links 34 and 36 protect the protector 10 from such damage by melting in such instances so that the circuits between the terminal 24 and the line electrode 16 and between the terminal 28 and the line electrode 18 are open.

More specifically, the shell 12 is an elongated, substantially closed housing made of an appropriate insulating material with an elongated side 38 open so that the gas tube arrester 14 can be disposed within the shell 12. In order to close off the open side 38 after the gas tube arrester 14 is placed within the shell 12 and in order that the gas tube arrester 14 and various other elements of the protector 10 are fixedly mounted within the shell 12, a potting epoxy 40 fills the portion of the shell 12 adjacent the open side 38. The remaining cavity or portion 42 of the inside of the shell 12 either can be left empty or can be filled with a mineral fill, silica, insulating powder or the like.

The gas tube arrester 14 is a standard gas tube arrester having its line electrodes 16 and 18 hermetically sealed at the ends of the tubular central ground electrode 20 by ceramic spacers 44 and 46, respectively. A portion of the electrodes 16 projects into the chamber formed by the electrode 20 so as to form a spark gap between the line electrode 16 and the ground electrode 20. Similarly, the line electrode 18 projects past the insulating spacer member 46 into the tubular ground electrode 20 so that a spark gap is formed between the line electrode 18 and the common electrode 20. Whenever a voltage of a sufficient magnitude is impressed on either of the line electrodes 16 or 18, the spark gap between that electrode and the ground electrode 20 breaks down coupling that electrode to the ground electrode 20. If there is sufficient available current caused by the over voltage surge, such as when a voltage spike occurs due to lightning or the like, the spark gap will completely arc over and the impedance between the line electrodes 16 and 18 and the ground electrode 20 will be relatively small. On the other hand, if there is a sustained overvoltage condition from a power cross or the like, the available current in some instances may be relatively low and the gas tube arrester 14 is placed in a glow mode of operation. In this glow mode operation, the spark gaps breakdown, but a relatively high impedance is maintained across the spark gaps between the line electrodes 16 and 18 and the ground electrode 20, and the protector 10 can be seriously damaged if this condition continues for a sufficient period of time.

The ground line 30 couples the ground electrode 20 to ground potential and is preferably a stranded copper wire, a portion 48 of which is either soldered or welded to the ground electrode 20. Normally, the portion 48 of the ground line 30 is soldered around approximately half of the circumference of the tubular ground electrode 20 so that the portion 48 acts as a wick to siphon any solder which might become molten due to an extended fault condition. As a result, the likelihood of the solder being expelled from underneath the portion 48 of the ground line 30 is reduced.

As best can be seen in FIGS. 2, 3, and 5, the line electrodes 16 and 18 are not directly connected to their respective terminal lines 22 and 26. Instead, the line electrode 16 is coupled to the terminal line 22 through the fusible link 34 and a supporting terminal or eyelet 50 and the line electrode 18 is coupled to the terminal line 26 through the fusible link 36 and a supporting terminal or eyelet 52. More specifically, the fusible link 34 is attached to an outer surface 54 of the line electrode 16 by appropriate means such as fusing the fusible link or lead 34 to the surface 54 so that a solder fillet 56 is formed. Similarly, the fusible lead 36 is attached to an end surface 58 of the line electrode 18.

Once the fusible lead 34 is connected to the surface 54, as illustrated in FIG. 3 of the drawings, a ceramic spacer element 60 having a cylindrical spacer cavity 62 therein, is placed about the fusible lead 34 and an end 63 of the spacer 60 is placed against the end surface 54 of the line electrode 16. The portion of the fusible lead 34 projecting out from an opposite end 64 of the ceramic spacer 60 is inserted through a hole 66 in a supporting terminal or eyelet 50. The fusible link 34 then is partially fused about the hole 66 to form a fillet 68. The fusible lead 34, and particularly the fillet 68, holds the supporting terminal 50 against the end 64 of the spacer 60 so that the spacer cavity 62 is closed by the eyelet 50 and the surface 54 of the line electrode 16.

The fusible link 36 otherwise extends through a ceramic spacer 70 and a hole 72 in the supporting terminal or eyelet 52. The fusible link 36 maintains the eyelet 52 in abutting relationship against the spacer 70 so that a spacer cavity 74 is formed through which the fusible link 36 extends.

Since the eyelets 50 and 52 are coupled to the terminal lines 22 and 26, respectively, any voltages that are present on the line connected to the terminal 24 is coupled to the line electrode 16 through the terminal line 22, the eyelet 50 and the fusible link 34. On the other hand, any voltages impressed on the telephone line coupled to the terminal 28 are coupled to the line electrode 18 through the terminal line 26, the eyelet 52, and the fusible link 36.

If an overvoltage surge occurs on the telephone line coupled to the terminal 24 and is of a high enough magnitude, the spark gap between the line electrode 16 and the ground electrode 20 is sparked over such that current flows to ground potential through the ground line 30 and the ground terminal 32. In this manner, the telephone line coupled to the terminal 24 is protected from such overvoltage surges. As long as the overvoltage surge is of a minimum time duration, the gas tube arrester 14 will be heated a minimum amount and revert to its normal state wherein the spark gap is open between the line electrode 16 and the ground electrode 20 after the overvoltage condition terminates.

There are certain situations when an overvoltage condition occurring on the telephone line coupled to either the terminal 24 or the terminal 28 can cause damage to the gas tube arrester 20 as well as the entire protector 10. This is due to the amount of heat that is generated as a result of the current flowing through the shorted spark gap between the line electrodes 16 and 18 and the ground electrode 20 for an extended period of time. On the other hand, if the current through the gas tube arrester 14 caused by such an extended overvoltage condition is in excess of 40 amperes, the coordinating wire or bridle wire which normally connects the telephone line to be protected to the terminal 24 or the terminal 28 would fuse open prior to any damage being done to the gas tube arrester 14. However, if the current is below the fuse open characteristics of such coordinating or bridle wires, such as when the available current is below one ampere and the gas tube arrester is placed in a glow mode of operation, the continuous conduction of current through the gas tube arrester 14 could damage the protector 10. Subsequently, the station protector or the like in which the protector 10 is mounted also can be damaged. Consequently, the lines coupled to the terminals 24 and 28 and the station will no longer be protected.

Accordingly, it is important to have the fusible links 34 and 36 fuse in an open condition when such continuous or extended conduction of the gas tube arrester 14 occurs and before damage to the gas tube arrester 14 or the shell 12 occurs. This type of extended conduction of the gas tube arrester 14 can particularly cause damage when the gas tube arrester 14 is placed in a glow mode condition as a result of a power line cross or induced voltage or the like because the spark gaps between the line electrodes 16 and 18 and the ground electrode 20 are not placed in a low impedance state, but rather the spark gaps between the line electrodes 16 and 18 and the ground electrode 20 are maintained in a breakdown state with a relatively high impedance. In this type of situation, the gas tube arrester 14 is heated to a great extent so that the shell 12 of the protector 10 can be readily damaged.

However, with the fusible link 34 coupled between the eyelet 50 and the line electrode 16 and the fusible link 35 coupled between the eyelet 52 and the line electrode 18, the gas tube arrester 14 is protected from being so overheated that damage can occur to the shell 12 of the protector 10. The fusible links 34 and 36 are preferably made of a common lead tin alloy which will melt and open the circuits between the eyelets 50 and 52 and the line electrodes 16 and 18, respectively, when low current surges occur and before extensive heat damage can occur to the shell 12.

More specifically, and as illustrated in connection with fusible link 34 in FIG. 6 of the drawings, the fusible links 34 and 36 will be heated due to the thermal heat generated in the gas tube arrester 14. As it is heated, the fusible link 34 will begin to neck down and become molten, as illustrated in parts A-C in FIG. 6. Finally, as illustrated in part D in FIG. 6, the fusible link 34 breaks apart partially due to the surface tension on the molten fusible link 34 and opens the circuit between the line electrode 16 and the eyelet 50. With the line electrode 16 being disconnected from the telephone line coupled to the terminal 24, no current is flowing through the gas tube arrester 14 and no further heat is generated therein. The remaining portions of the fusible link 34 are deposited generally on the surface 54 and around the hole 66 in the eyelet 50.

As is seen particularly in FIG. 6, the ceramic spacer 60 provides a cavity 62 in which the fusible link 34 can melt during an extended overvoltage condition. Likewise, the spacer 70 provides a cavity 74 in which the fusible link 36 can melt during an extended overvoltage condition. The spacers 60 and 70 also assist in the positioning of the eyelets 50 and 52 so that the appropriate length of the fusible leads 34 and 36 will be established. Without the spacers 60 and 70, the fusible leads 34 and 36 would be embedded in the potting epoxy 40 such that they would be supported in their molten state and not fuse open during an extended conduction of the gas tube arrester 14.

As previously indicated, the fusible leads 34 and 36 can be made of a common lead tin alloy. The selection of such an alloy for the fusible links 34 and 36, and the physical shape and size of the fusible links 34 and 36 are determined by the fact that the fusible links 34 and 36 must have a greater current carrying capacity than the coordinating or bridle wire which interconnect the telephone lines to the protector 10. However, the fusible links 34 and 36 must still be capable of fusing open when there are extended low current surges before extensive heat damage to the shell 12 occurs. In addition, the fusible links 34 and 36 must be readily coupled both electrically and thermally to the surfaces 54 and 58 of the line electrodes 16 and 18, respectively, and must take a minimal volume of space so that the contact between the gas tube line electrodes 16 and 18 and the eyelets 50 and 52, respectively, are not reestablished once the links 34 and 36 have melted.

In order to minimize the thermal heat transfer from the gas tube arrester 14 through the potting epoxy 40 during the extended conduction of the gas tube arrester 14, an insulating powder, mineral fill, or the like of a chemically inert mineral can be injected into the remaining inside portion 42 of the shell 12. The delaying of the heat loss from the gas tube arrester 14 by this fill raises the temperature of the gas tube electrodes 16 and 18 during the extended conduction period so that a more effective and efficient operation of the melting of the fusible links 34 and 36 occurs resulting in less thermal degradation of the gas tube arrester 14 or the shell 12.

In addition, any mineral fill that is placed in the cavity 42 provides a low bulk density pocket in the area about the portion 48 of the ground line 30. Since the ground electrode 20 also heats substantially during a fault condition, the solder attaching the portion 48 of the ground line 30 to the ground electrode 14 tends to melt. The mineral fill about the line portion 48 accomodates any resultant expansion of the solder as its melts and prevents any undue internal pressures being placed on the shell 12 and the potting compound 40.

Referring now to FIG. 7 of the drawings, therein is disclosed an alternate embodiment of the present invention generally indicated by the numeral 10A. The various parts of the protector 10A are referred to by the same number as corresponding similar parts of the protector 10 except for the addition of the letter "A" following the number. Essentially, the protector 10A operates in the same manner as the protector 10 to insure that the arrester 14A is not excessively heated during extended fault conditions. The arrester 14A is somewhat different in size than the arrester 14, so that the eyelet 50A is of a slightly different configuration, and the cavity 62A formed in the spacer 60A also is slightly different in configuration. In any event, the fusible link 34A tends to melt in the same manner as the fusible link 34 in the protector 10 when an extended overvoltage fault condition occurs and when the arrester 14A is heated to a point where the arrester 14A and the shell 12A can be damaged.

Although the present invention is described with reference to two illustrative embodiments thereof it should be understood that numerous other modifications and embodiments of the invention can be devised by those skilled in the art that will fall within the spirit and scope of the principles of this invention.

What is claimed as new and desired to be secured by United States Letters Patent of the United States is:

1. An overvoltage arrester protector for protecting telephone lines from high voltages and surge currents comprising:

a housing means, a gas tube overvoltage arrester having a first line electrode and a ground electrode coupled to a reference potential, a first line terminal means coupled to one of said telephone lines, a cavity means disposed adjacent said gas tube arrester such that a cavity is disposed adjacent said first line electrode, said cavity means includes a first insulating spacer means having a first cavity extending through said first spacer means from a first end of said first spacer means to the second end of said first spacer means, said first cavity being closed at said first end by said first line electrode and said first cavity being closed at said second end by said first terminal means, a first fusible lead coupling said first terminal means to said first line electrode, said first fusible lead extends through said cavity and is in thermal relationship with said gas tube arrester, said first fusible lead being fusibly connected to said first line electrode and to said first terminal means so as to assist in maintaining said first terminal means against said second end of said first spacer means, and maintaining means to maintain said gas tube arrester in said housing.

2. The overvoltage arrester protector as set forth in claim 1 wherein said housing means is made of an insulating material with one elongated side substantially open and holding means substantially closing said open side and maintaining said overvoltage arrester, a portion of said first terminal means, and said cavity means within said housing means.

3. The overvoltage arrester protector as set forth in claim 1 wherein said first fusible lead is made of a fusible material designed to melt when the overvoltage arrester becomes sufficiently heated and is designed to have a current carrying capacity at least as great as a connecting wire coupling said first terminal means to said one of said telephone lines.

4. The overvoltage arrester protector as set forth in claim 2, including inert insulating means disposed about said gas tube overvoltage arrester.

5. An overvoltage arrester protector for protecting telephone lines from high voltages and surge currents comprising:

a housing means, a gas tube overvoltage arrester having first and second line electrodes and a ground electrode coupled to a reference potential, a first line terminal means coupled to one of said telephone lines, and a second line terminal means coupled to another of said telephone lines, a cavity means disposed adjacent said gas tube arrester such that a cavity is disposed adjacent each of said first and second line electrodes, said cavity means includes a first insulating spacer means having a first cavity extending through said first spacer means from a first end of said first spacer means to a second end of said first spacer means, said first cavity is closed at said first end by said first line electrode and said first cavity is closed at said second end by said first terminal means, said cavity means further includes a second insulating spacer means having a second cavity extending through said second spacer means from a third one of said second spacer means to a fourth end of said second spacer means, said second cavity is closed at said third end by said second line electrode and said second cavity is closed at said fourth end by said second terminal means, a first fusible lead coupling said first terminal means to said first line electrode, said first fusible lead extends through said cavity, is in thermal relationship with said gas tube arrester, and is fusibly connected to said first line electrode and to said first terminal means so as to assist in maintaining said first terminal means against said second end of said first spacer means, a second fusible lead coupled between said terminal means and said line electrode, said second fusible lead is in thermal relationship with said gas tube arrester, and is fusibly connected to said second line electrode and to said second terminal means so as to assist in maintaining said second terminal means against said fourth end of said second spacer means, and maintaining means to maintain said gas tube arrester in said housing.

* * * * *